US005176948A

United States Patent [19]

Nguyen et al.

[11] Patent Number: 5,176,948

[45] Date of Patent: Jan. 5, 1993

[54] PERMANENT MARKING ARTICLE

[75] Inventors: Nga K. Nguyen, Austin; James L. Sadlo, Round Rock, both of Tex.

[73] Assignee: Minnesota Mining and Manufacturing Company, St. Paul, Minn.

[21] Appl. No.: 805,868

[22] Filed: Dec. 11, 1991

[51] Int. Cl.[5] .......... B32B 9/00

[52] U.S. Cl. .......... 428/195; 428/349; 428/46; 428/913

[58] Field of Search .......... 428/131, 913, 195, 34.9, 428/335, 336, 46, 352, 355

[56] References Cited

U.S. PATENT DOCUMENTS

| | | | |
|---|---|---|---|
| 3,894,731 | 7/1975 | Evans | 269/47 |
| 4,055,249 | 10/1977 | Kojima | 206/447 |
| 4,246,709 | 1/1981 | Selleslags | 40/2 R |
| 4,304,705 | 12/1981 | Heilmann et al. | 260/30.4 N |
| 4,317,852 | 3/1982 | Ogden | 428/40 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,465,717 | 8/1984 | Crofts et al. | 428/40 |
| 4,569,759 | 1/1986 | Ben Aim et al. | 210/304 |
| 4,868,023 | 9/1989 | Ryan et al. | 428/35.1 |
| 5,108,836 | 4/1992 | Ocampo et al. | 428/335 |

*Primary Examiner*—Patrick J. Ryan
*Assistant Examiner*—W. A. Krynski
*Attorney, Agent, or Firm*—Gary L. Griswold; Walter N. Kirn; Darla P. Neaveill

[57] ABSTRACT

A die-cut permanent marking article for use with an elongate object, consisting of a strip of low molecular weight heat-sensitive, transparent polymeric film having an upper and a lower surface, at least a portion of the lower surface being capable of self-adherence, at least a portion of the upper surface being imprintable, the polymeric film being fusible by the application of heat, but remaining transparent even after application of heat such that any marking placed on any portion of the article remains readable even if covered by one or more overwrapping portions of the strip.

12 Claims, No Drawings

PERMANENT MARKING ARTICLE

BACKGROUND OF THE INVENTION

1. Field of the Invention

The present invention relates to identification of elongate objects using indicia wherein a mark is both rendered permanent and protected using an optically clear means of attachment.

2. Description of the Related Art

It is frequently necessary to identify components in electrical assemblies, particularly where a multiplicity of wires and/or cables need to be identified. Various marking systems for wire cables and the like are known in the art.

Wires and cables have been identified by impressing characters into the insulation surrounding the wire. This has the disadvantage of possible damage to the insulation. Early attempts to create permanent marking assemblies employed plastic tubes which slip over the cable. These may be loose or may use heat-shrink technology as disclosed in U.S. Pat. No. 3,894,731. However, these assemblies require application during installation, since they must be slipped onto or over an unterminated wire. This limits any marking of already installed cable, or redesignation.

Later, heat-shrink sleeves were formed as wrap-around versions, which employed strips of heat-shrink film. It is necessary to secure the final "wrap" to prevent the formation of a free end. This is known in the industry as flagging. However, both tubular and wrap-around shrink sleeves employ radial shrinkage. The identification is usually printed or typed onto the article, and rendered permanent by a heat treatment. This is referred to as "permatization", and may be accomplished by heating in an oven or subjecting to infrared radiation. This is expensive, and may not be effective for elongate articles which are dark in color.

U.S. Pat. No. 4,569,759, (Brewers) discloses an adhesive tape construction used for identification markers to be applied to wire cables or switch structures. A pressure-sensitive adhesive layer is applied to the lower surface of a transparent substrate, which has an opaque ink-receptive area. The tape is cut into individual strips which are adhesively attached side-by-side on a release carrier material. The information is inscribed on the ink-receptive area. The marker strip is then removed from the release liner by peeling back the tape, and applied by attaching the head section to the wire and wrapping it upon itself so that the width dimension of the tape becomes the length of the marker. Multiple layers of strips may be arranged upon one another.

U.S. Pat. No. 4,465,717, (Crofts et al.) discloses a means for marking elongate objects in which a carrier supports a strip of marking material consisting of a heat-shrink film coated with a heat-reactive adhesive. Two stripes of pressure-sensitive adhesive are applied to the heat-reactive adhesive. The identification is then applied to the strip on the surface opposite to that holding the adhesive. The marker is imprinted and applied temporarily via the pressure-sensitive adhesive. Permanent attachment is achieved by applying heat which activates the heat-reactive adhesive and shrinks the sleeve.

U.S. Pat. No. 4,246,709, (Selleslags) discloses a holder for an identification sheet which comprises two transparent films bonded by their side edges. When heated, the composite curls relative to a single axis. For use, the identification is added as a sheet between the two films. The composite is then applied and heated, whereupon it curls around the wire until it conforms. A hot-melt adhesive may be used to attach the identification permanently to the wire.

U.S. Pat. No. 4,868,023, (Ryan et al) discloses indicia which are applied to a polyolefin surface using a pigmented ink, which cures at elevated temperatures to provide a permanent mark.

It has now been discovered that a marking article may be formed via wrap-around techniques to provide either a temporary or a permanent marker. This marker is flag-free and has permanent readability due to protection afforded by an optically clear wrap of the article.

Further, because the polymeric film used in the article is dimensionally stable, the imprinted area does not suffer from distortion of the markings thereon.

SUMMARY OF THE INVENTION

The invention provides an identification system for marking of elongate objects such as pipes or electrical wires. The identification mark is displayed on a strip of material which is positioned by wrapping it around the elongate object.

Specifically, the invention provides a die-cut permanent marking article for use with an elongate object, comprising a strip of low molecular weight heat-sensitive, transparent polymeric film having an upper and a lower surface, at least a portion of the lower surface being capable of self-adherence, at least a portion of the upper surface being imprintable, said polymeric film being fusible by the application of heat, said polymeric film remaining transparent even after application of heat such that any marking placed on any portion of the article remains readable even if covered by one or more overwrapping portions of said strip.

Preferred marking articles of the invention consist of a strip of low molecular weight heat-sensitive, transparent polymeric film having an upper and a lower surface, a portion of the upper surface being coated with an opaque, imprintable layer, at least a portion of the lower surface being coated with a pressure-sensitive adhesive, said transparent polymeric film extending beyond said opaque layer such that a portion of the strip appears opaque, and a portion of the strip appears transparent, said polymeric film being fusible by the application of heat, said polymeric film remaining transparent even after application of heat such that any marking placed on said opaque layer remains readable even if covered by one or more overwrapping portions of said strip.

The invention also provides a final marked elongate object having a tubular permanent marking article positioned longitudinally around said elongate object, said article consisting of a plurality of overwraps and an imprinted area, said overwraps having been at least partially fused by the application of heat, the imprinted area being clearly readable both before and after application of heat. Further, there is no distortion of the polymeric film caused by changes in dimension as the products are dimensionally stable when heated.

As used herein, the following terms have the indicated definitions.

1. The term "wrap" means a sufficient length of polymeric strip applied such that it has wound around the elongate object one time.

2. The term "overwrap" means any wrap after the first.

3. The term "imprintable" means capable of permanently retaining writing or typing thereon.

4. The term "readable" means easily discernable, and not exhibiting excess distortion.

5. The term "self-adherence" means capable of sticking to another similar surface with finger pressure, either due to an inherent property of the surface or a coating thereon.

DETAILED DESCRIPTION OF THE INVENTION

The successful use of identification markers of the present invention depends upon careful selection of polymeric substrates. These substrates must be transparent films which, when heated, will self-fuse to produce the desired structure. For example, a rectangular strip of film may be rolled along its length to form a tubular structure. The wall thickness of the tubular structure is determined by the number of film overwraps which are produced by the rolling of the rectangle. When heat is applied to the tube, the overwraps must fuse together to form a clear transparent polymeric tube. The outer surface of the tube will ideally be smooth and seam-free.

Materials useful for the low molecular weight heat-sensitive layer of the invention thus are those polymeric films which are dimensionally stable and self-fuse with the application of heat in a certain temperature range. Suitable polymers include polyolefinic homopolymers, copolymers and suitable mixtures thereof. Specific materials include polyethylene, polypropylene, polyallomers, ethylene vinyl acetate (EVA), and the like. A number of ethylene vinyl acetate polymers are useful, differing in the proportion of vinyl acetate incorporated into the polymer. Preferred film materials are low molecular weight EVA polymers.

When in use, preferred articles of the invention, have a suitable imprinted area or layer incorporated into the tubular configuration. One method of incorporating such area is by coating a portion of the upper surface of the polymeric strip with an imprintable layer. The portion of the strip may be such that the final position of the imprinted layer is either at the inner surface of the tube, (having been the first wrap) or inside the tubular wall. Either location is equally satisfactory, as the transparent polymer allows the identification to be viewed at any position within the tubular wall. It is preferred that the identification be covered by at least the final or outer wrap of the polymeric material to prevent accidental erasure. Most preferably, the layer appears at one end of the upper surface of the polymeric film, and extends approximately 25% of the length of the film.

Preferably the area capable of receiving said imprinting is opaque, for maximum contrast and readability, however, a transparent coating may be used where desired. Indeed, the polymeric film may be imprintable in its entirety, such that markings may be made wherever desired prior to application. When an additional coating is used to obtain an imprintable area, the coating may be a similar or differing polymeric resin as the transparent film. Opacifying fillers such as talc, $TiO_2$, pigments, dyes and the like are useful.

At least a portion of the lower surface of the strip is capable of self-adherence. This may be due to an inherent tackiness of the polymer used, an additive therein, or a coating of heat-sensitive or pressure-sensitive adhesive. This area is important to assure initial adherence of the layers to each other and/or to the substrate. A pressure-sensitive adhesive may be coated on the lower surface of the entire polymeric film, or on only a portion thereof.

Many various heat-sensitive adhesives may be used, including but not limited to epoxies, silicones, acrylics, rubbery block copolymer adhesives, polyesters, polyolefins and the like. Examples of suitable adhesives include those available from Shell Chemical Company under the trademarks, Kraton TM, those available from Firestone Tire and Rubber under the trade names Stereon TM and "NFA", from B. F. Goodrich under the tradenames "Estane", Hycar TM and Hypalon TM from DuPont under the tradename "Hytrel", from Minnesota Mining and Manufacturing Company, hereinafter "3M", under the tradenames, "Isotac", Scotch TM, and the like.

Preferred pressure-sensitive adhesives are acrylic adhesives. They can be monomers and/or oligomers such as acrylate, acrylamides, methacrylates, methacrylamides, vinyl pyrrolidone and azlactones, as disclosed in U.S. Pat. No. 4,304,705, (Heilmann). Such monomers include mono-, di-, or poly-acrylates and methacrylates.

Preferred acrylates are typically alkyl acrylates, preferably monofunctional unsaturated acrylate esters of non-tertiary alkyl alcohols, the alkyl groups of which have from 1 to about 14 carbon atoms. Included with this class of monomers are, for example, isooctyl acrylate, isononyl acrylate, 2-ethyl-hexyl acrylate, decyl acrylate, dodecyl acrylate, n-butyl acrylate, and hexyl acrylate. The alkyl acrylate monomers can be used to form homopolymers or they can be copolymerized with polar copolymerizable monomers selected form strongly polar monomers such as monoolefinic mono- and dicarboxylic acids, hydroxyalkyl acrylates, cyanoalkyl acrylates, acrylamides or substituted acrylamides, or from moderately polar monomers such as N-vinyl pyrrolidone, acrylonitrile, vinyl chloride or diallyl phthalate. The strongly polar monomer preferably comprises up to about 25%, more preferably up to about 15%, of the polymerizable monomer composition. The moderately polar monomer preferably comprises up to about 30%, more preferably from about 5% to about 30% of the polymerizable monomer composition.

The acrylate pressure-sensitive adhesive also contains initiator to aid in polymerization of the monomers. Suitable initiators include such as thermally-activated initiators such as azo compounds, hydroperoxides, peroxides, and the like, and photoinitiators such as the benzoin ethers.

The acrylate pressure-sensitive adhesive matrix may also be cross-linked. Preferred crosslinking agents for the acrylic pressure-sensitive adhesive matrix are multiacrylates such as 1,6-hexanediol diacrylate as well as those disclosed in U.S. Pat. No. 4,379,201 (Heilmann et al.), incorporated herein by reference, or any of the triazine crosslinkers taught in U.S. Pat. Nos. 4,330,590 (Vesley), and 4,329,384 (Vesley et al.), both of which are incorporated by reference. Each of the crosslinking agents is useful in the range of from about 0.01% to about 1% of the total weight of the monomers.

Useful materials which can be blended into any pressure-sensitive adhesive used include, but are not limited to, fillers, pigments, plasticizers, tackifiers, fibrous reinforcing agents, woven and nonwoven fabrics, foaming agents, antioxidants, stabilizers, fire retardants, and rheological modifiers, so long as such additions do not adversely affect the readability and dimensional stability of the final article.

The pressure-sensitive adhesive may be coated on only a small portion of the film, preferably 25% or less. When only a portion of the polymeric film is coated with the pressure-sensitive adhesive, it preferably appears at the opposite end of the strip as the ink-receptive area.

The pressure-sensitive adhesive may be eliminated altogether, when the film is inherently capable of self-adherence. This is easily accomplished by the addition of a suitable tackifier. Examples include tackified films comprising ethylene vinyl acetate polymers, which possesses sufficient tack to self-adhere. Strips of film thus form self-adherent overwraps, rather than merely the final overwrap. This eliminates processing steps and expensive adhesive formulations, without reducing the benefits of a self-adherent article.

Tackifiers useful in articles of the invention have softening temperatures of from about 65° C. to about 110° C., and do not degrade or substantially inhibit the fusion of the polymeric overwraps when heated. Further, useful tackifiers do not affect the clarity of the polymeric resin either initially or after heating.

Suitable tackifiers include hydrogenated rosin esters. Ethylene glycol, glycerol, and pentaerythritol are the most common alcohols used for esterification. Rosin esters are quite stable and resistant to hydrolysis. Preferred tackifiers are highly hydrogenated, such as those available from companies such as Hercules, Inc., under such tradenames as Foral TM 65, Foral TM 85, Piccolyte TM, Pentaly TM, and the like.

Multiple strips of the invention are typically provided on a release liner, and may be peeled off for use. However, because the polymeric film used for the strips is thin and tends to be self-adherent, it may be difficult for some persons to peel strips from the liner. Additionally, it is not desirable to touch the lower surface of the film, as this reduces self-adherence, and the fingers may transmit oil or dirt to the lower surface, impeding good fusion and/or transparency.

In one preferred embodiment, the article also comprises a detaching means for easy removability from the release liner. The means is preferably a handling tab produced by cut or partially cut lines in the release liner wherein the polymeric strip overlays at least a portion of such tab, so that removal of the tab from the release liner results in removal of the strip from the release liner wherein the polymeric strip may be handled without contacting the adhesive.

The polymeric strip is used by inscribing suitable marks or indicia in the imprintable area. The end of the strip closest to the now imprinted area is then placed against the elongate object, with the lower uncoated surface of the film in contact with the object. The strip is wound around the elongate object, overwrapping itself, so that a multilayer tubular structure is formed. The film or adhesive coating thereon adheres each overwrap to the previous one. As the final wrap is applied, the adhesive coating on the tail, (or a final section of self-adherent film) contacts the previous wrap and holds the tail in place temporarily. The strip may be peeled from the elongate article at this point, and repositioned, if desired.

Once applied, the article may be rendered permanently attached by the application of sufficient heat, preferably in the range of from about 50° C. to about 75° C. The film overwraps then at least partially fuse together to form a tubular article having a smooth seam-free surface. During and after heating the film retains its transparency such that the indicia are readable even though the ink receptive area is covered and protected by several wraps of film. The rigidity of attachment, and thickness of the tubular wall is influenced by the wrapping technique used. If tightly wound, the tubular article will move longitudinally only with great difficulty, and will have thicker walls, produced by more overwraps. If more loosely wound, the tubular article will move along the elongate object with ease.

EXAMPLES

Example 1

A heat-fusible film marker of the present invention was prepared using film comprising 90% of an ethylene vinyl acetate (EVA) copolymer (containing 12% vinyl acetate) and 10% of a tackifier material. The EVA copolymer, designated Elvax TM 3135AC was commercially available from DuPont de Nemours & Co.(-DuPont). The tackifier, Piccotac TM 95 is also commercially available from Hercules Corporation.

A Brabender TM mixer was used to compound the tackified EVA at 120° C. and the mixture was taken out when the temperature reached 160° C. and at that time torque reading was 120 RPM. Average mixing time was about 10 minutes. Sample quantities of the compounded resin are formed into sheets using a conventional Wabash TM hot-press. Film formation was accomplished by placing a suitable quantity of the compounded polymer between sheets of silicone release liner. This sandwich construction was placed between the jaws of the hot-press. The jaws of the press were closed and 37.5 lbs/sq. inch of pressure was applied for 3 minutes at a temperature of 162° C. (350° F.). After releasing the pressure, the sandwich construction was removed from the press and allowed to cool. The outer layers of release liner were removed from the tackified polymer layer which was now a film 125 micrometers (5 mils) thick.

A film sample having dimensions 6"×6" (15.24 cm×15.24 cm) was laid on a flat surface. A strip of transfer adhesive 0.31 cm (0.125") wide, supported on a release liner, was applied along the edge of the film. Thus applied, one surface of the adhesive was attached to the film and the other surface was protected by release liner. Similar strips of adhesive were applied, parallel to the first strip, at 2.5 cm intervals until the film was covered with multiple adhesive strips. The resulting adhesive bearing construction was converted into individual markers 2.5 cm long and 1.9 cm wide. Each marker had a protected strip of adhesive at one end.

The marker was wrapped around a wire to produce a tubular structure which acts as the wire marker. This was accomplished by placing the uncoated end of the marker against the wire. The orientation of the marker was such that the adhesive, on the final wrap of film, made contact with the previous film wrap, when the liner was removed. It thus became adhesively attached and maintained the form of the tubular structure. The wrapped construction may be wound in a tight or loose configuration. The latter allows repositioning before heating. Heating, which fuses the film wraps together, converts the wrapped structure into a permanent tubular configuration or sleeve. Fusion occurs at temperatures in the range 60 to 80 degrees centigrade. These temperatures may be attained using a suitable hot air gun.

Identification of individual wires may be accomplished by either applying suitable indicia to e.g. the upper surface of the first wrap of the marker or overwrapping an information label with the clear fusible marker. The completed, fused tubular identification marker may be securely positioned on the wire or loosely applied so that it will slide along the wire after heating.

EXAMPLE 2

A tubular film marker was produced as in Example 1, except that Piccotac TM 95 was replaced by Regalite TM 7070.

EXAMPLE 3

A film of ethylene vinyl acetate copolymer (EVA) was selected such that it contains from 4-12% vinyl acetate and has a thickness of 50 micrometers (2 mils). This material was converted into heat fusible wire markers of the present invention, after application of adhesive and an imprintable area. The adhesive and imprintable materials were applied to opposite surfaces of the film. A tackified acrylate adhesive (available from 3M) supported on a suitable release liner was applied to the under-side of the 62 micrometers (2.5 mil) film. Lamination was accomplished using a WEBTRON 650 applicator. This provides a web for flexographic printing where horizontal bars of an imprintable "ink" (SSOWP-6916 from Louis Ink Inc.) were applied at 5 cm intervals to the upper surface and across the width of the film.

The resulting material was converted using a Webtron 1000 converter. During this process, the web was cut into strips 3.8 cm×2 cm. Each strip comprised a film which had an imprintable area at one end of the upper surface of the film. The lower surface of the film strip was full-coated with an adhesive which was further protected by a release liner. (In use, the desired identification mark is applied to the imprintable area.)

The protective liner was removed from the strip and it was initially attached to a wire by contact with adhesive directly below the imprintable area. When the remainder or tail of the strip was wrapped around itself and the wire, a tubular marker was formed. The wire identification was protected by the film wraps and could be clearly viewed through the transparent adhesive and film layers. In this condition the marker is repositionable, i.e., it may be removed if desired by unwrapping.

If desired, the marker may be rendered permanent by directing hot air at between 60 and 80 degrees centigrade towards the wrapped marker for about 3 seconds. A conventional hot air gun is suitable for this purpose. At temperatures in the prescribed range, the layered structure of the wrapped film strip fuses to produce a permanent tubular wire marking sleeve.

What is claimed is:

1. A die-cut permanent marking article for use with an elongate object, consisting of a strip of low molecular weight, heat-sensitive, transparent polymeric film selected from the group consisting of polyethylene, polypropylene, polyallomers, ethylene vinyl acetate, copolymers thereof, and mixtures thereof, having an upper and a lower surface, at least a portion of the lower surface being capable of self-adherence, at least a portion of the upper surface being fusible by the application of heat, said polymeric film remaining transparent even after application of heat, such that any marking placed on any portion of the article remains readable even when covered by one or more overwrapping portions of said strip.

2. A marking article according to claim 1 wherein a portion of the upper surface is coated with an opaque, imprintable layer, said transparent polymeric film extending beyond said opaque layer such that a portion of the strip appears opaque, and a portion of the strip appears transparent, said polymeric film being fusible by the application of heat, said polymeric film remaining transparent even after application of heat such that any marking placed on said opaque layer remains readable even if covered by one or more overwrapping portions of said strip.

3. A permanent marking article according to claim 1 wherein said film is an ethylene vinyl acetate polymer.

4. A permanent marking article according to claim 3 further comprising a tackifier.

5. A permanent marking article according to claim 4 wherein said tackifier is a hydrogenated rosin ester.

6. A marking article according to claim 1 wherein said portion of said lower surface capable of self-adherence has been coated with a pressure-sensitive adhesive.

7. A permanent marking article according to claim 6 wherein said pressure-sensitive adhesive covers no more than 25% of said lower surface of said polymeric strip.

8. A permanent marking article according to claim 7 wherein said adhesive is selected from the group consisting of silicones, acrylics, elastomeric block copolymer adhesives, polyesters, and polyolefins.

9. A permanent marking article according to claim 8 wherein said adhesive is an acrylic adhesive.

10. A kit comprising a multiplicity of permanent marking articles according to claim 1 releasably attached to a liner.

11. A kit according to claim 10 further comprising a detaching means for easily removing said articles from said liner.

12. A kit according to claim 11 wherein said detaching means for each permanent marking article comprises a handling tab formed by cut or partially cut lines in said release liner, wherein the polymeric strip overlays at least a portion of such tab, so that removal of the tab from the release liner results in removal of the strip from the release liner.

* * * * *